May 12, 1953   C. O. LARSON   2,638,386
STRUCTURAL JOINT
Filed Feb. 19, 1947
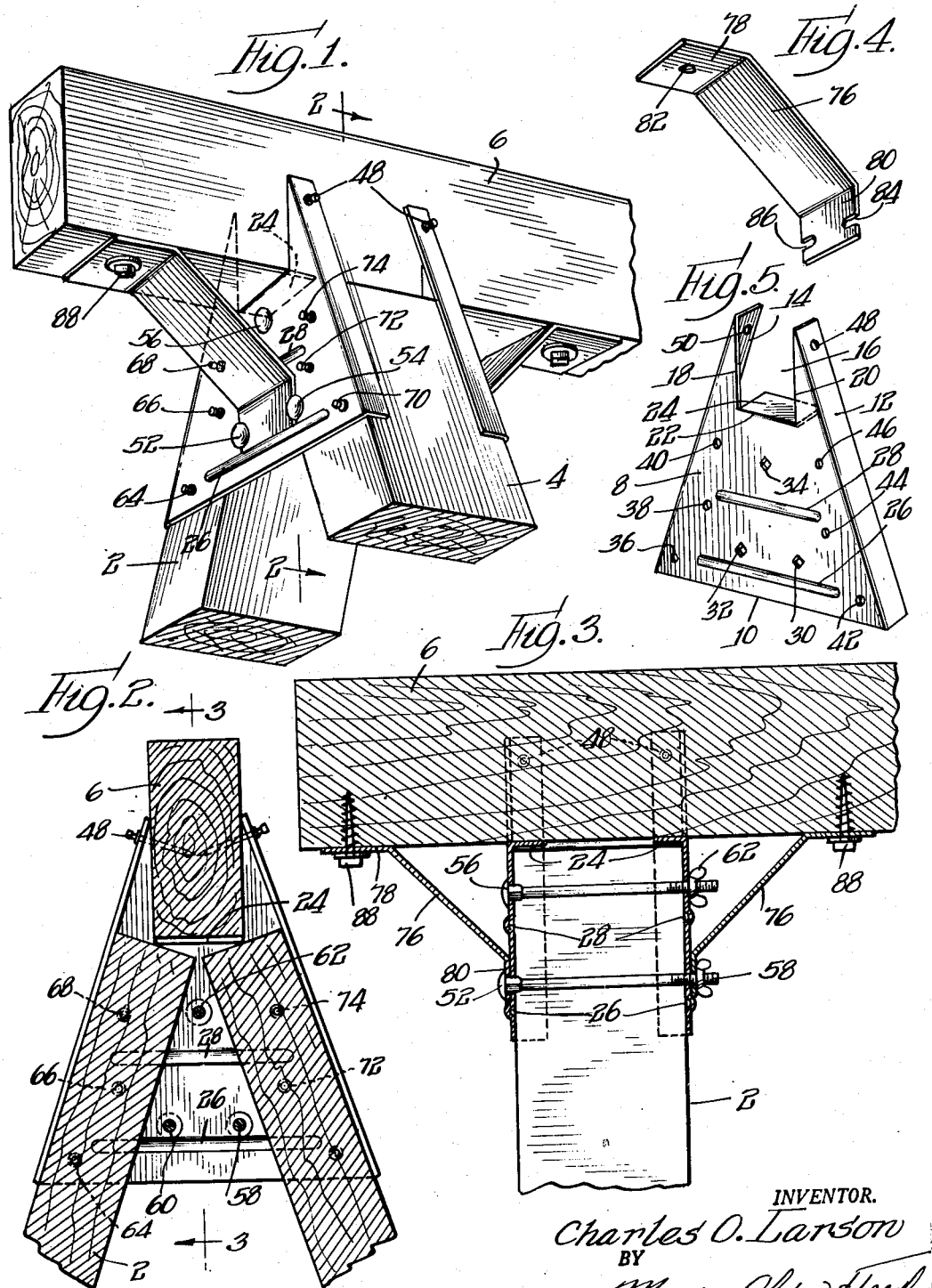
INVENTOR.
Charles O. Larson
BY
Moore, Olson & Trexler
attys.

Patented May 12, 1953

2,638,386

UNITED STATES PATENT OFFICE 2,638,386

STRUCTURAL JOINT

Charles O. Larson, Sterling, Ill.

Application February 19, 1947, Serial No. 729,434

1 Claim. (Cl. 304—5)

This invention relates to structural joints including those employed in saw horses, ladders, stiles, and other constructions ordinarily made of wood, and wherein strong joints between the beams or other members thereof are required.

Among the objects of the present invention is to provide an improved type of sheet metal saw horse bracket or plate wherein two such identical plates are utilized to clampingly engage therebetween converging leg members or other structural beams, together with a cross beam, whereby the same are rigidly held in joined together position, and particularly wherein a pair of strut members are interconnected to the underside of the beam and the side wall of the brackets to provide reinforced rigidity and to provide additional means for holding the pair of plates or brackets to the cross beam while the two converging leg members or other wooden members are held in clamped together position between the pair of brackets and in a manner to receive and hold the cross beam itself.

Another object of the invention resides in providing a pair of sheet metal bracket members and a pair of sheet metal struts constructed and arranged detachably to engage with and to be clamped by the fastening means, such as bolts, which interconnect the two clamping plates or brackets to the leg members or other structural members and whereby the struts are arranged to be fastened to the underside of the cross beam and detachably fastened to the plate members.

Another object of the invention is to provide a pair of bracket members or plates of sheet metal adapted to clamp therebetween the converging top portions of two leg members or converging structural beams, together with the cross beam received by the plate members, the brackets or plate members having spaced apart openings disposed in substantially pyramidal, spaced apart formation with the apex of the pyramidal shaped openings located uppermost, said openings being arranged so that when bolts are passed through the registering openings the three bolts will act as guiding means for the upper converging portions of the two leg members or other structural members for guiding and directing the same relatively to the overlapping side flanges of the plate or bracket members.

These and other objects of the invention will be apparent from a perusal of the following specification when taken in connection with the accompanying drawing, wherein:

Figure 1 is a perspective view of my improved sheet metal bracket member and strut for forming a structural joint between converging members in a cross beam;

Figure 2 is a section taken on the line 2—2 of Figure 1;

Figure 3 is a section taken on the line 3—3 of Figure 2;

Figure 4 is a perspective view of the strut member; and

Figure 5 is a perspective view of one of the sheet metal bracket or plate members.

Referring now to the drawings in detail, the invention is herein illustrated as applied to a structural joint, particularly a structural joint for holding together the leg members 2 and 4 to the top beam or cross support 6. To accomplish this, duplicate or identical sheet metal plates or brackets are used, in combination with duplicate and identical strut members. Each bracket or plate is formed in the construction shown in Figure 5 in particular, and comprises a plate member 8 of a generally truncated pyramidal form having a longer basal portion 10 and two converging right angularly disposed integral sheet metal flanges 12 and 14 which are bent into parallelism on the same side face which is the inner face of the plate 8. The upper edge of the truncated pyramidal plate 8 is provided with a rectangular shaped notch 16, the parallel edges 18 and 20 forming such notch merging into a bottom edge 22 formed by bending over an integral part of the cutout so as to form a horizontally extending flange 24 which extends inwardly on the inner face of the plate 8 or on the same side of the plate as the flanges 12 and 14 project. The opposite or outer side of the plate is provided with two bumped out strengthening ribs 26 and 28, both of which are preferably formed parallel to the base and to each other, and in addition each plate is provided with a pair of holes 30, 32 and 34. These holes are arranged in pyramidal relation with the holes 30 and 32 disposed at the base and parallel to the reinforcing bumper 36 and the upper or apexal wall 34 being located above the reinforcement 28 and below the flange 22. In addition each plate 8 is provided with a series of screw or nail holes 36, 38, 40, 42, 44 and 46 which are adapted to receive nails, screws or other fasteners which penetrate the upper portions of the leg members to fasten the brackets thereto.

In addition, the upper portion of each flange 12 and 14 is provided with fastener, nail, or screw holes 48 and 50 through which nails or screws are adapted to pass to engage into the side walls of the beam 6 whereby to fasten the brackets or plates to the beam 6.

It is to be noted that the notch formed in the upper wall of the plate is of dimensions snugly to receive the cross sectional arrangement of the beam 6 so that the same rests in the spaced notches of the pair of plates and rests upon the flanges 24 of these plates.

Three bolts 52, 54 and 56 pass through the registering bolt openings 30, 32 and 34 of the plates and these bolts are provided with heads at one end and at the opposite end are threaded to receive wing nuts 58, 60 and 62 which clampingly tighten the plates together to grip the upper ends of the converging leg portions or structural members therebetween.

The fastening nails or screws 64, 66, 68, 70, 72 and 74 pass through the fastener openings in the plate to engage the legs or other structural members 2 and 4 whereby to fasten these plates directly to the legs.

Means is provided for structurally reinforcing or rigidifying the joint between the assembled plates or brackets and leg members 2 and 4, or the like, to the opposite member 6. This means comprises a pair of sheet metal struts or braces 76 having angularly bent ends 78 and 80, the end 80 being bent at right angles to the end 78 and each of the ends being bent substantially forty-five degrees to the central portion 76. The end 78 is provided with a central fastener opening 82 and the tab or end 80 is provided with a pair of opposed notches 84 and 86. These struts are applied in the manner shown in Figures 1 and 2 by having a fastening means such as a screw or nail pass through the opening 82 into the underside of the beam 6 and the bolts 52 and 54 will engage in the notches 86 and 84 detachably to clamp the lower end of this strut against the outer side wall of the plate 8. This occurs on both sides with respect to both brackets so that when the struts are thus clamped the entire structural joint will be very rigidly reinforced not only by the clamping plates or brackets but also by the angularly disposed strap or strut member 76. Due to the spacing and angularity of the strut members the leg or other members 2 and 4, will be structurally held from movement in a direction longitudinally of the structural beam 6, and furthermore the strut member will act as a means for rigidly interconnecting the bracket members 8 with the beam at spaced apart intervals along the beam and on opposite sides of the brackets and the two leg members.

It will thus be seen that I have provided a very strong, rigid, structural joint for interconnecting three angularly disposed wooden members by means of sheet metal parts which are fastened for rigid and detachable interconnection.

Obviously the invention is not limited to the specific details of construction disclosed herein but is capable of other modifications and changes without departing from the spirit and scope of the appended claim.

Having thus described the invention, what is claimed as new and desired to be secured by Letters Patent is:

In a device of the class described, a top beam, a pair of legs convergingly related to each other and to the beam at opposite and end portions of the beam, means for securing each pair of legs together and to the beam, said means comprising a pair of separate, independent and identical stamped sheet metal plates for each pair of legs, each plate including a tapered quadrilateral face portion having an approximately rectangular notch inset from its shorter upper parallel side for receiving the top beam and having straight flanges extending right angularly from its converging sides and engaged with the outer faces of the legs, fastening bolts disposed in pyramidal spaced relation passing through openings in the side plates between the spaced upper portions of the converging legs for clamping the plates together with the legs therebetween, each of said plates having an outstanding integral rigidifying boss extending parallel to and spaced from the bottom edge of the plate, and a pair of sheet metal struts each comprising an elongated strip having its opposite ends bent substantially forty-five degrees to the plane of the intermediate portion of the strip, one of said ends of each strut having a fastener opening, and fastener means for securing the same to the spaced underside of the beam on each side of the legs, and the other end of each strut lying in contact with the upper wall of said rigidifying boss, two of the pyramidal spaced apart openings for the bolts lying immediately above said rigidifying boss, and the lower end of said sheet metal strut having end slots into which said last mentioned pair of spaced bolts pass whereby said bolts which clamp the clamping plates together likewise clamp the rigidifying struts in position.

CHARLES O. LARSON.

References Cited in the file of this patent
UNITED STATES PATENTS

| Number | Name | Date |
|---|---|---|
| 390,103 | Wallace | Sept. 25, 1888 |
| 436,120 | Chubbuck | Sept. 9, 1890 |
| 438,280 | Wright | Oct. 14, 1890 |
| 1,211,069 | Brethour | Jan. 2, 1917 |
| 1,811,094 | Roos | June 23, 1931 |
| 1,942,003 | Rundle | Jan. 2, 1934 |
| 2,197,187 | Larson | Apr. 16, 1940 |
| 2,376,787 | Larson | May 22, 1945 |